Jan. 15, 1952 R. H. WEIR 2,582,809
AIR AND FUEL REGULATING MEANS IN INTERNAL-COMBUSTION
TURBINE POWER PLANTS
Filed Oct. 30, 1945 2 SHEETS—SHEET 1

INVENTOR
Robert Hendry Weir
BY
Stevens and David
his ATTORNEYS

Patented Jan. 15, 1952

2,582,809

UNITED STATES PATENT OFFICE 2,582,809

AIR AND FUEL REGULATING MEANS IN INTERNAL - COMBUSTION TURBINE POWER PLANTS

Robert Hendry Weir, Farnborough, England, assignor to Power Jets (Research and Development) Ltd., London, England, a British company Application October 30, 1945, Serial No. 625,538
In Great Britain December 30, 1944

18 Claims. (Cl. 60—35.6)

1

This invention relates to internal combustion turbine power plants operating on the continuous or constant pressure cycle in which air is compressed in a compressor, and discharged continuously into a combustion chamber into which fuel is injected and burnt at constant pressure, and in which the heated compressed air and products of combustion are expanded to a lower pressure through a turbine which drives the compressor.

More particularly the invention relates to internal combustion turbine power plants for aircraft and of the kind employing a compressor discharging into a series of combustion chambers, the outlets from which are connected to the inlet or nozzle box of the turbine.

On a turbine engined aircraft, either a simple jet or fitted with a propeller or a ducted fan, reduction of engine speed to give a desirable cruising airspeed entails a considerable loss of potential range, this effect being particularly noticeable when an exceptionally high powered engine is installed to secure a very high top speed and climb performance. This loss of potential range, i. e., the difference between the range actually achieved with the large engine and the range possible with a smaller engine, is a maximum at sea level. It diminishes with increase in altitude, as engine speed is increased to maintain optimum flying speed. In terms of maximum endurance (hours) this potential loss is probably greater than in the case of maximum range (miles).

Thus, for example, it has been found to be worthwhile with a twin-engined aircraft, to cruise on one engine when flying at low altitudes, notwithstanding the losses inherent in assymmetrical thrust, and to reserve twin-engined operation for high-speed flying, climbing and high altitude work. In this manner the actual range at all altitudes can be made more nearly equal.

Now the primary object of the present invention is to provide, for a single turbine engined aircraft, a power unit which will enable the above-mentioned operational advantage, attainable in a twin-engined aircraft, to be secured without the introduction of assymmetrical thrust which is inherent in the twin-engined aircraft when flying on one engine only.

According to the invention, the internal combustion turbine power unit is provided with air and fuel regulating means whereby the air consumption can be considerably reduced, say to approximately a half of the normal air consump-

2 tion, and the fuel consumption can be correspondingly reduced, so as to obtain an approximately corresponding reduction in thrust with the same specific fuel consumption as at maximum thrust and full airflow.

In order that the invention may be clearly understood and readily carried into effect, the same will now be more fully described with reference to and by the aid of the embodiment illustrated in the accompanying drawings; wherein.

Figure 1:
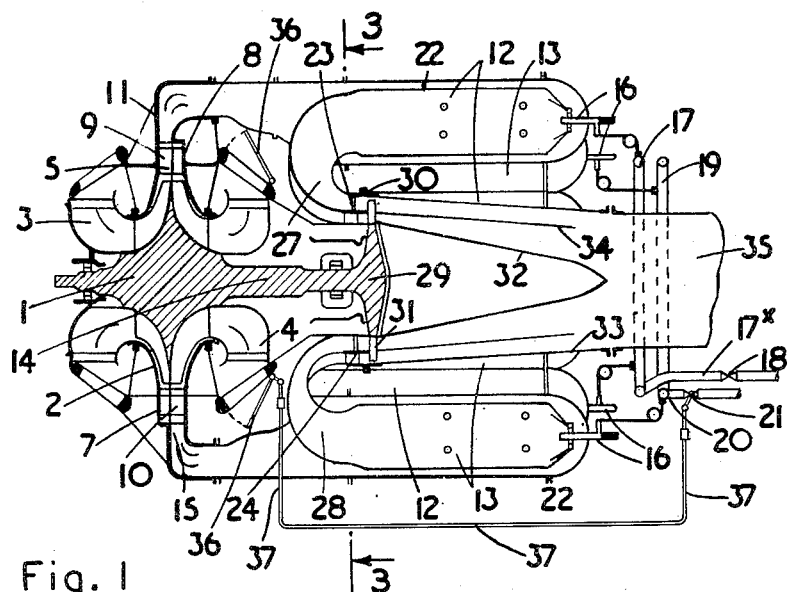
Fig. 1 is an axial section of the internal combustion turbine power unit for a single engined aircraft.
Figure 2:
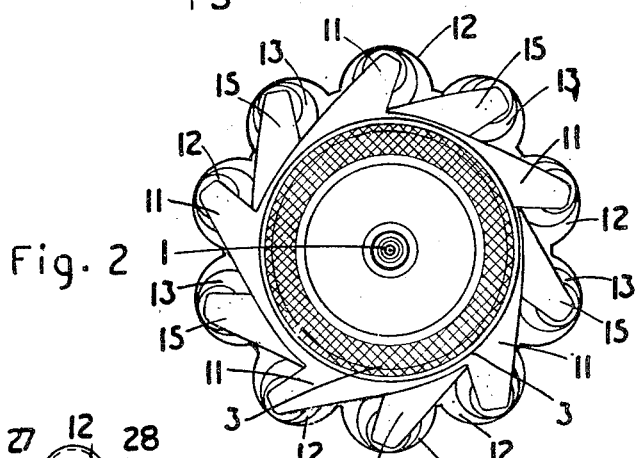
Fig. 2 is an end elevation, looking on the front of the power unit.
Figure 3:
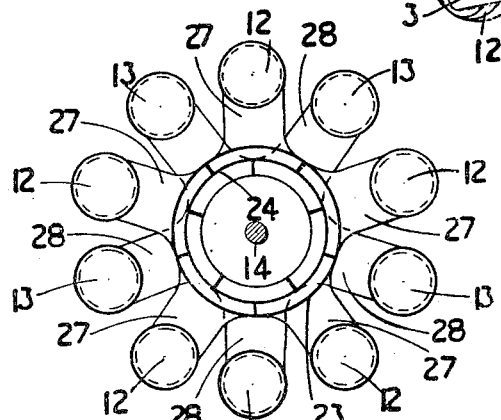
Fig. 3 is a section taken on the line 3—3 in Fig. 1.
Figure 4:
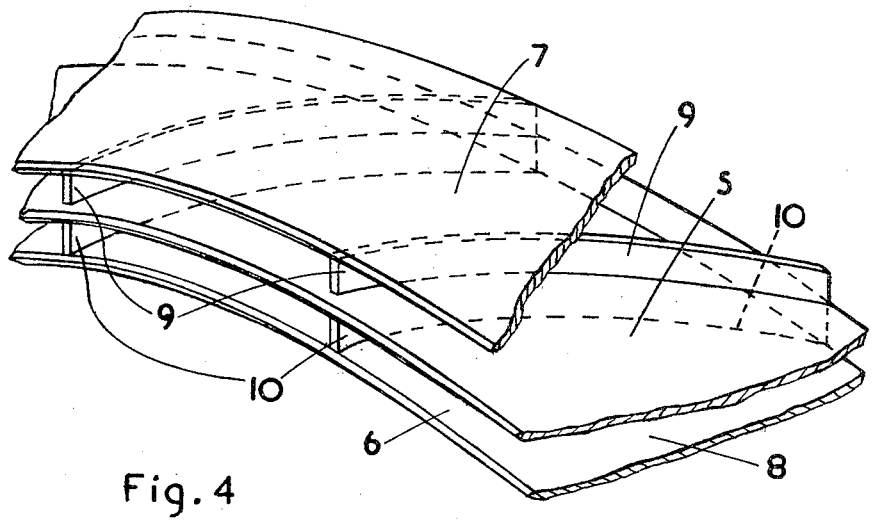
Fig. 4 is a fragmentary view of the splitter type diffuser.
Figure 5:
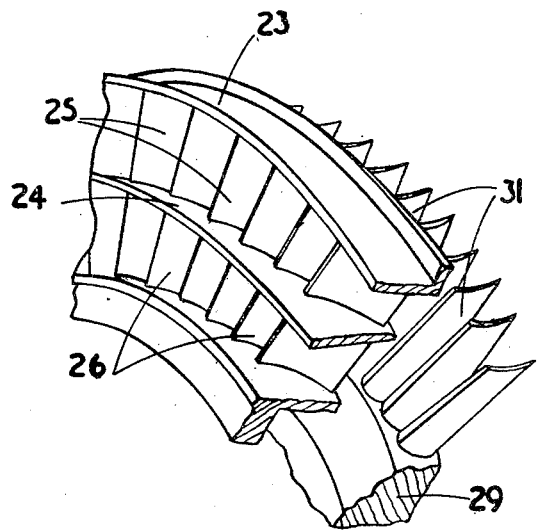
Fig. 5 is a fragmentary view of the turbine nozzle box and turbine blading.

Referring more particularly to Figs. 1, 2 and 3, the internal combustion turbine power unit comprises a centrifugal compressor or blower having a double-sided impeller 1 operating in a stator casing 2 which has laterally opposed air intakes 3, 4 respectively. The air flows from the front and rear sides of the impeller 1 are kept separate by a splitter type diffuser which, as shown more clearly in Fig. 4, comprises a central annular "splitter" plate 5 having a knife edge 6 in close proximity to the rim of the impeller 1, side plates 7, 8 also of annular form and located one on either side of and distanced from the central plate 5 by tangential or spirally arranged interconnecting walls or diffuser vanes 9, 10, which latter jointly with the central plate 5 and side plates 7, 8 define two annular series of tangential or spiral flow passages. Thus the diffuser not only keeps the airflows from opposite sides of the impeller separate but divides them each into a series of separate flows.

The flow passages defined between the plates 7, 5 and the dividing walls 9 of the diffuser are connected by tangential trunks 11 one to each alternate combustion chamber 12 of an annular series of combustion chambers 12, 13 which extend rearwardly from the compressor or blower. The other alternate combustion chambers 13 in the annular series are connected by tangential trucks 15 one to each of the flow passages which are defined by the plates 5, 8 and the dividing walls 10 of the diffuser.

The combustion chambers 12, 13 are fitted internally at their rear ends with fuel injection burners 16, those in the chambers 12 being fed from a common ring type manifold 17 supplied by a pipe 17ˣ under the control of a valve 18, and those in the chambers 13 being similarly fed by a ring type manifold 19 and supply pipe 20 with a control valve 21. Each of the combustion chambers has an internal perforated flame-tube 22 which surrounds the combustion zone and defines jointly with the casing of the combustion chamber a jacketting air-flow passage leading to the entrance at the rear end of the baffle 22.

The inlet or nozzle box 23 of the turbine is divided by a shroud ring 24 to afford outer and inner annular flow passages in which are fitted appropriately formed stator blades or guide vanes 25, 26 respectively, and the outlets of the alternate combustion chambers 12 are connected by ducts 27 to the outer annular flow passage of the nozzle box 23 whilst the outlets of the other alternate combustion chambers 13 are similarly connected by ducts 28 to the inner annular flow passage of said nozzle box. The turbine, which drives the compressor through the axial shaft 14, comprises a disc 29 running in a stator casing 30 and carrying radial turbine blades 31 immediately to the rear of and extending across both flow passages of the nozzle box whilst to the rear of the turbine an axially disposed exhaust bullet 32, concentric exhaust casing 33 and a concentric intermediate partition 34 extending rearwardly, define outer and inner concentric exhaust passages which lead into a rearwardly extending jet pipe 35.

The air intake 4 of the compressor or blower is provided with valve means 36 (illustrated as a simple flap valve, although it may be in the form of an interleaved throttling plate or iris diaphragm shutter), whereby the airflow through the rear half of the stator casing 2, associated flow passages of the diffuser, trunks 15, combustion chambers 13, ducts 28, inner annular flow passage of the nozzle box 23, and the inner exhaust passage defined by the axially disposed exhaust bullet 32 and partition 34, can be cut off or reduced to a mere trickle of air for cooling purposes.

With the above described arrangement, for normal operation, both air intakes 3, 4 to the double-sided centrifugal compressor or blower would be fully open and all the combustion chambers 12 and 13 would have fuel supplied to them, whilst when maximum economy is required, say during taxiing, or on a long glide, or cruising at low/medium altitude, the valve means 36 would be closed so as to render the rear half of the compressor or blower inoperative. Simultaneously with the closing of the valve means 36 to cut off the air supply to the rear half of the compressor or blower, except possibly for a very small quantity for cooling purposes, the valve 21 controlling the fuel supply to the alternate combustion chambers 13, which are associated with and fed from the rear half of the compressor or blower, would be closed, say by means of an appropriate mechanical or hydraulic linkage (indicated diagrammatically by the reference 37 in Fig. 1) connecting the valve 21 to the valve means 36. The forward half of the compressor or blower would continue to function normally, supplying air to its associated combustion chambers 12, the products of combustion or hot gases passing thence through the associated outer annulus of the nozzle box 23 to the outer portions of the turbine blades 31 and by way of the outer exhaust passage, defined by the partition 34 and casing 33, to the jet 35.

Under these latter conditions the engine will consume approximately one half of the normal air flow, and since the most efficient part of the turbine blading is employed, i. e., the outer portion, it may be assumed that this will offset any losses, due to pumping the smaller quantity of air through the inoperative half of the compressor and associated combustion chambers and the sudden diffusion in the exhaust system, and that the engine will produce approximately a half the normal or maximum thrust or power with the same specific fuel consumption as at full thrust and full airflow. The loss of maximum thrust or power associated with the introduction of a splitter type diffuser and the division of the exhaust stream from the combustion chambers will be small and its effect on aircraft performance negligible where an extremely large engine is fitted. This loss will, in some measure, be offset if the throttling plate or flap valve is fitted to the rear intake, where it may act as a radiation shield and so reduce the amount of preheating of the air entering the associated intake.

The above described arrangement enables (a) considerable gain in aircraft range (probably 40 per cent at sea level diminishing to 10 per cent at 30,000 ft.) to be attained, (b) fuel consumption during taxiing and on long glide from high altitude to be reduced, and (c) a reduction of approximately 50 per cent idling jet thrust, in addition to the effect of the variable nozzle on the jet pipe, to be obtained.

When running the engine with one half of the compressor or blower inoperative, it may be possible to obtain a better specific fuel consumption than with full airflow and thrust or power, since as the turbine blading stresses will be less and the blade roots will be cool, it should be possible to raise the maximum combustion temperature within the limit set by the combustion equipment.

Whereas the invention has been described with reference to an embodiment employing a double-sided centrifugal compressor discharging into an even number of combustion chambers and usable as an aircraft power plant, the invention can be applied to any turbine engine, including stationary units, and is to be considered as limited only by the appended claims.

What I claim as my invention and desire to secure by Letters Patent is:

1. An internal combustion power unit of the kind operating on the constant pressure cycle, comprising in combination an air compressor having two separate and distinct air flow paths, two sets of combustion chambers, each set receiving air from one of said air flow paths, means for injecting and burning fuel continuously in said combustion chambers to provide working gas, a turbine operated by said gases from said combustion chambers and driving said compressor means for reducing the air supply from one of said air flow paths to its said sets of combustion chambers so that it is at most a mere trickle therethrough for cooling purposes, and means for cutting off the fuel supply to said set of combustion chambers to which the air supply can be reduced, said means for reducing the air supply being such that when the air supply is reduced and the fuel supply is cut off for said set of combustion chambers both the air and fuel consumptions of the power unit are reduced to approximately a half, to obtain an approximately corresponding reduction in thrust or power with the same specific fuel consumption, as at maximum thrust or power and full air flow.

2. An internal combustion turbine power unit of the kind operating on the constant pressure cycle, comprising in combination an air compressor, an annular series of combustion chambers, a splitter type diffuser associated with the said compressor whereby the air flow is split into portions which are kept separate, trunks which lead said separated air flow portions to alternate combustion chambers of said annular series, means for injecting and burning fuel continuously in said combustion chambers and including separate fuel supply manifolds respectively feeding the injection burners of alternate combustion chambers in the said annular series, a nozzle box affording annular flow passages, duct means connecting the annular flow passages of said nozzle box respectively to the outlets of alternate combustion chambers in the said annular series, a turbine of the bladed disc type operated by the hot gases discharged through the nozzle box flow passages from the combustion chambers, said turbine being co-axial with and connected to the compressor so as to drive it, air regulating valve means which can be substantially closed to cut off the air supply to one set of alternate combustion chambers (except possibly for a mere induced trickle of air for cooling purposes) and valve means for cutting off the supply of fuel to the manifold of that set of alternate combustion chambers the air supply to which can be cut off by the said air regulating valve means so that with both air and fuel valve means closed both the air and fuel consumptions are reduced to approximately a half to obtain an approximately corresponding reduction in thrust or power with the same specific fuel consumption as at maximum thrust or power and full air flow.

3. An internal combustion turbine power unit of the kind operating on the constant pressure cycle, comprising in combination a compressor of the centrifugal type having a double-sided impeller and laterally opposed air intakes, an annular series of combustion chambers, a splitter type diffuser associated with the said impeller whereby the air flows from opposite sides thereof are kept separate, trunks which lead said separated air flows to alternate combustion chambers of said series, means for injecting and burning fuel continuously in said combustion chambers, a nozzle box affording two concentric annular flow passages, duct means connecting the annular flow passages of said nozzle box respectively to the outlets of alternate combustion chambers in the said series, a turbine of the bladed disc type operated by the hot gases discharged through the nozzle box flow passages from the combustion chambers and connected to the impeller of the compressor so as to drive it, air regulating valve means associated with one of the lateral air intakes of the compressor, whereby it can be substantially closed to cut off the air supply to one set of alternate combustion chambers (except possibly for a mere trickle of air for cooling purposes), and valve means for cutting off the supply of fuel to that set of alternate combustion chambers the air supply to which can be cut off by the said air regulating valve means so that with both said air and fuel valve means closed both the air and fuel consumptions are reduced to approximately a half to obtain an approximately corresponding reduction in thrust or power with the same specific fuel consumption as at maximum thrust or power and full air flow.

4. An internal combustion turbine power unit for the propulsion of aircraft and of the kind operating on the constant pressure cycle, comprising in combination, a compressor of the centrifugal type having a double-sided impeller and laterally opposed air intakes, an annular series of combustion chambers, a splitter type diffuser associated with the said impeller whereby the air flows from opposite sides thereof are kept separate, trunks which lead said separated air flows to alternate combustion chambers of said annular series, means for injecting and burning fuel continuously in said combustion chambers and including separate fuel supply manifolds respectively feeding the injection burners of alternate combustion chambers in the said annular series, a nozzle box affording annular flow passages, duct means connecting the annular flow passages of said nozzle box respectively to the outlets of alternate combustion chambers in the said annular series, a turbine of the bladed disc type operated by the hot gases discharged through the nozzle box flow passages from the combustion chambers, said turbine being coaxial with and connected to the impeller of the compressor so as to drive it, propulsion jet means through which the turbine exhaust gases are discharged axially of the unit, air regulating valve means associated with one of the lateral air intakes of the compressor whereby it can be substantially closed to cut off the air supply to one set of alternate combustion chambers (except possibly for a mere induced trickle of air for cooling purposes), and valve means for cutting off the supply of fuel to the manifold of that set of alternate combustion chambers the air supply to which can be cut off by the valve controlled air intake of the compressor, so that with both valve means closed both the air and fuel consumptions are reduced to approximately a half to obtain an approximately corresponding reduction in thrust or power with the same specific fuel consumption as at maximum thrust or power and full air flow.

5. An internal combustion turbine power unit for the propulsion of aircraft, as claimed in claim 4, wherein the air and fuel valve control means are interconnected by a linkage so that both valves open and close simultaneously.

6. An internal combustion turbine power unit for the propulsion of aircraft as claimed in claim 4, wherein the annular series of combustion chambers is arranged coaxially with and extends rearwardly of the centrifugal double-sided compressor.

7. An internal combustion turbine power unit for the propulsion of aircraft as claimed in claim 4, wherein the inner and outer flow passages of the nozzle box are provided with guide vanes.

8. An internal combustion turbine power unit for the propulsion of aircraft, as claimed in claim 4, wherein the propulsion jet means comprise exhaust passages for the gases from the inner and outer portions of the turbine, said exhaust passages being defined by an exhaust bullet, arranged axially and extending rearwardly of the turbine, a concentric exhaust casing, and a concentric intermediate partition, and leading into an exhaust jet.

9. An internal combustion turbine power unit for the propulsion of aircraft, as claimed in claim 4, wherein the rear lateral air intake of the double-sided compressor is valve controlled and that set of alternate combustion chambers which are normally supplied with air from the valve-controlled side of the compressor have their outlets connected to the inner flow passage of the turbine nozzle box.

10. An internal combustion turbine power unit for the jet propulsion of aircraft and of the kind operating on the constant pressure cycle, comprising in combination a compressor of the centrifugal type having a double-sided impeller and laterally opposed air intakes, an annular series of combustion chambers arranged coaxially with and extending rearwardly of said compressor, valve means associated with the rear lateral intake of the compressor whereby it can be substantially closed to cut off the supply of intake air to that side of the compressor at will, a splitter type diffuser surrounding the said double-sided impeller whereby the airflows from opposite sides thereof are kept separate and split up into streams, trunks which lead the separate air streams of said separated flows to alternate combustion chambers of said annular series, fuel injection burners located in the rear ends of said combustion chambers, fuel supply manifolds respectively feeding the fuel injection burners of alternate combustion chambers in the annular series, valve means for cutting off at will the supply of fuel to the manifold of that set of alternate combustion chambers the air supply to which is derived from the rear side of the compressor, a nozzle box affording inner and outer annular flow passages, guide vanes in said inner and outer flow passages of the nozzle box, duct means connecting the outer annular flow passage of said nozzle box to the outlets of that set of alternate combustion chambers which derives its air supply from the forward side of the compressor, duct means connecting the inner annular flow passage of said nozzle box to the outlets of that set of alternate combustion chambers which derives its air supply from the rear side of the compressor, a turbine of the bladed disc type operated by the hot gases discharged through the nozzle box flow passages, said turbine being located immediately to the rear of said nozzle box and being arranged coaxially with and connected to the impeller of the compressor so as to drive it, an exhaust bullet arranged axially and extending rearwardly of the turbine, an exhaust casing arranged concentrically with the exhaust bullet, a concentric partition intermediate the exhaust casing and exhaust bullet and defining jointly therewith outer and inner exhaust passages, a rearwardly extending exhaust jet into which said exhaust passages lead, and linkage means interconnecting the valve means associated with the rear lateral intake of the compressor and the valve means controlling the fuel supply to that set alternate combustion chambers which derives its air supply from said rear lateral intake, so that both said valve means are opened and closed simultaneously.

11. A gas turbine power unit of the kind operating on the constant pressure cycle comprising in combination a turbine, a compressor group driven by said turbine and having a flow system which affords separate and distinct air flow paths each extending from the air inlet of said compressor group, through said compressor group to the air outlet of said compressor group to subdivide the total air mass flow output of said compressor group into separate and distinct parts, a combustion system for burning fuel in the air mass flow output of said compressor group for providing working fluid for said turbine having separate and distinct combustion chamber groups equal in number to the number of separate and distinct air flow paths and connected thereto so that each combustion chamber group receives from its associated air flow path only a part of said air mass flow output of said compressor group, and delivers it as hot working fluid separately to said turbine, each airflow path and connected combustion chamber group constituting a separate and distinct passage extending from the air inlet of said compressor to the inlet of said turbine, a fuel supply system for supplying the fuel supply requirements to said combustion system having fuel burner means in each of said combustion chamber groups for supplying thereto a separate and distinct part of said fuel requirements, air flow regulating means for controlling the air mass flow output to said combustion system and operable to reduce the total air mass flow from said compressor group by cutting out at least one of said separate and distinct air flow paths, and a fuel regulating means actuated in conjunction with said air regulating means to regulate the fuel supply requirements to said combustion system and operable to reduce the fuel supply requirements by cutting out the burner means in each combustion chamber group connected with a cut-off air flow path whereby the air mass flow can be considerably reduced and the fuel supply correspondingly reduced so as to obtain an approximately corresponding reduction in power with the same specific fuel consumption as at maximum power and full air flow.

12. A gas tubine power unit of the kind operating on the constant pressure cycle comprising in combination a turbine, a compressor group driven by said turbine and having a flow system which is formed with not less than two separate and distinct air flow paths each extending from the air inlet of said compressor group, through said compressor group to the air outlet of said compressor group to sub-divide the total air mass flow output of said compressor group into separate and distinct parts, a combustion system for burning fuel in the air mass flow output of said compressor group to provide working fluid for said turbine having separate and distinct combustion chamber groups equal in number to the number of separate and distinct air flow paths and connected thereto so that each combustion chamber group receives from its associated air flow path only a part of said air mass flow output of said compressor group and delivers its hot working fluid separately to said turbine; each air flow path and connected combustion chamber group constituting a separate and distinct passage from the air inlet of said compressor to the inlet of said turbine, a fuel supply system for supplying the fuel requirements to said combustion system having fuel supply pipes to and burner means in each of said combustion chamber groups for supplying thereto a separate and distinct part of said fuel supply requirements, propulsion jet means through which the turbine exhaust gases are discharged, air valve means for controlling the air mass flow output to said combustion system and operable to reduce the total air mass flow from said compressor group by cutting off the air mass flow from at least one of said separate and distinct air flow paths except for a mere trickle for cooling purposes, and fuel valves in said supply pipes actuated in conjunction with said air valve means to regulate the fuel to said combustion system and operable to reduce the fuel supply requirements by cutting out the burner means in each combustion chamber group connected with a cut-off air flow path whereby the air mass flow can be considerably reduced and the fuel supply correspondingly reduced so as to obtain an approximately corresponding reduction in power with the same specific fuel consumption as at maximum power and full air flow.

13. A gas turbine power unit of the kind operating on the constant pressure cycle comprising in combination a turbine, a compressor group driven by said turbine and having a flow system which affords separate and distinct air flow paths, each extending from the air inlet of said compressor group, through said compressor group to the air outlet of said compressor group to subdivide the total air mass flow output of said compressor group into separate and distinct parts, and a combustion system for burning fuel in the air mass flow output of said compressor group for providing working fluid for said turbine having separate and distinct combustion chamber groups equal in number to the number of separate and distinct air flow paths and connected thereto so that each combustion chamber group receives from its associated air flow path only a part of said air mass flow output of said compressor group, each air flow path and connected combustion chamber group constituting a separate and distinct passage extending from the air inlet of said compressor to the inlet of said turbine.

14. A gas turbine power unit comprising in combination a turbine, a compressor group driven by said turbine and having a flow system which affords separate and distinct air flow paths, each extending from the air inlet of said compressor group, through said compressor group to the air outlet of said compressor group to subdivide the total air mass flow output of said compressor group into separate and distinct parts, and a combustion system for burning fuel in the air mass flow output of said compressor group, said combustion system having separate and distinct heat flow paths equal in number to the number of separate and distinct air flow paths and connected thereto so that each heat flow path receives from its associated air flow path only a part of said air mass flow output of said compressor group, each air flow path and connected heat flow path constituting a separate and distinct passage extending from the air inlet of said compressor to the inlet of said turbine.

15. A gas turbine power unit comprising in combination a turbine, a compressor group driven by said turbine and having a flow system which affords separate and distinct air flow paths, each extending from the air inlet of said compressor group, through said compressor group to the air outlet of said compressor group to subdivide the total air mass flow output of said compressor group into separate and distinct parts, a combustion system for supplying heat to the air mass flow output of said compressor group by combustion of fuel therein and having separate and distinct heat flow paths equal in number to the number of separate and distinct air flow paths through the compressor system and connected thereto, each air flow path and connected heat flow path constituting a separate and distinct passage extending from the inlet of said compressor to the inlet of said turbine, and a fuel system for supplying fuel to the combustion system and having burner means to supply fuel independently to each of said heat flow paths of said combustion system.

16. A gas turbine power unit of the kind operating on the constant pressure cycle comprising in combination a turbine, a compressor group driven by said turbine and having a flow system which affords separate and distinct air flow paths, each extending from the air inlet of said compressor group, through said compressor group to the air outlet of said compressor group to subdivide the total air mass flow output of said compressor group into separate and distinct parts, a combustion chamber system for burning fuel in the air mass flow output of said compressor group to provide working fluid for said turbine and having separate and distinct combustion chamber groups equal in number to the number of separate and distinct air flow paths of said compressor group flow system and connected thereto so that each combustion chamber group receives from its associated air flow path only a part of said air mass flow output of said compressor group, each air flow path and connected combustion chamber group constituting a separate and distinct passage extending from the inlet of said compressor to the inlet of said turbine, air flow regulating means for the air flow of at least one of the separate and distinct air flow paths of said compressor group whereby the air mass flow to its associated combustion chamber group can be reduced to obtain a reduction in the total air mass flow to the combustion chamber system and an approximately corresponding reduction in power.

17. A gas turbine power unit comprising in combination a turbine, a compressor group driven by said turbine and having a flow system which affords separate and distinct air flow paths, each extending from the air inlet of said compressor group, through said compressor group to the air outlet of said compressor group to subdivide the total air mass flow output of said compressor group into separate and distinct parts, a combustion system for supplying heat to the working fluid of said turbine by combustion of fuel in the air mass flow output of said compressor group, said combustion system having separate and distinct heat flow paths equal in number to the number of separate and distinct air flow paths of said compressor group and connected thereto, each air flow path and connected heat flow path constituting a separate and distinct passage extending from the air inlet of said compressor to the inlet of said turbine, and regulating means for the air flow and heat flow of at least one of said separate and distinct air flow paths and associated heat flow path whereby the air and heat flow can be reduced to obtain a reduction in the total heat flow and an approximate corresponding reduction in power.

18. A gas turbine power unit comprising, in combination, a turbine, a compressor group driven by said turbine and having a flow system which affords separate and distinct air flow paths, each extending from the air inlet of said compressor group, through said compressor group to the air outlet of said compressor group to subdivide the total air mass flow output of said compressor group into separate and distinct parts, a combustion system for supplying heat to the working fluid of said turbine by combustion of fuel in the air mass flow output of said compressor group and having separate and distinct heat flow paths equal in number to the number of separate and distinct air flow paths of said compressor group and each air flow path and connected heat flow path constituting a separate and distinct passage extending from the air inlet of said compressor to the inlet of said turbine, a fuel system for supplying fuel to said combustion system and having means to supply fuel independently to each of said heat flow paths of said combustion system, and regulating valve means for the air mass flow and for its associated independent fuel supply for at least one of the separate and distinct air flow paths and its separate and distinct heat flow path whereby the air flow and the fuel supply can be reduced to obtain a reduction in the total air flow and heat flow and an approximate reduction in power.

ROBERT HENDRY WEIR.

REFERENCES CITED

The following references are of record in the file of this patent:

UNITED STATES PATENTS

| Number    | Name    | Date          |
|-----------|---------|---------------|
| 1,619,460 | Cage    | Mar. 1, 1927  |
| 1,986,435 | Heinze  | Jan. 1, 1935  |
| 2,408,743 | Elliott | Oct. 8, 1946  |